United States Patent [19]

Muller

[11] Patent Number: 4,907,986

[45] Date of Patent: Mar. 13, 1990

[54] ADAPTER FOR STATION PROTECTOR

[76] Inventor: Mark W. Muller, 6865 Meadowcrest #614, North Richland Hills, Tex. 76180

[21] Appl. No.: 260,503

[22] Filed: Oct. 20, 1988

[51] Int. Cl.[4] .............................................. H01R 13/40
[52] U.S. Cl. ..................................... 439/535; 379/412
[58] Field of Search ................ 439/535, 79, 80, 78; 379/412, 397, 399

[56] References Cited

U.S. PATENT DOCUMENTS

| D. 287,583 | 1/1987 | Smith et al. | 379/412 X |
|---|---|---|---|
| 4,184,730 | 1/1980 | Huebner | 439/79 |
| 4,488,008 | 12/1984 | Dellinger, et al. | 379/179 |
| 4,500,158 | 2/1985 | Dola | 439/535 |
| 4,562,311 | 12/1985 | Dola | 379/412 X |
| 4,616,897 | 10/1986 | Dola | 439/535 |
| 4,624,514 | 11/1986 | Smith | 379/412 |
| 4,647,725 | 3/1987 | Dellinger et al. | 379/29 |
| 4,667,272 | 5/1987 | Fasano | 379/412 X |
| 4,742,541 | 5/1988 | Cwirzen | 379/397 X |
| 4,749,359 | 6/1988 | White | 439/133 |

FOREIGN PATENT DOCUMENTS 2334070  1/1975  Fed. Rep. of Germany ........ 439/78

OTHER PUBLICATIONS

AT and T Practice Instruction Sheet-2100 Series Customer Service Closure TII Installation note: TII 123 NI Station Protector with Network Interface. Issue No. 1, Apr. 1985.

Primary Examiner—William Briggs

[57] ABSTRACT

An adapter for mounting a station protector, which has a base and an upright wall having an opening therein, to a cover which is not shaped to grasp the station protector under ordinary conditions. The adapter has exterior surfaces so dimensioned as to be removably grasped by the cover.

5 Claims, 5 Drawing Sheets

ADAPTER FOR STATION PROTECTOR

BACKGROUND OF THE INVENTION

1. Field of the Invention

The field of the invention is network interface device retrofit kits for application to station protection devices which have already been installed.

2. Background of the Invention

A station interface and protector apparatus for use on a telephone line pair is described in U.S. Pat. No. 4,624,514, issued Nov. 25, 1986, the contents of said patent being incorporated herein by reference. Included in the station interface and protector apparatus described in U.S. Pat. No. 4,624,514 (hereafter TII Device), is a base portion 64 and a cover 20.

A device performing a similar function is the AT&T 2100 series customer service closure (hereafter AT&T Device), which has a mounting base and a cover which snaps onto the mounting base. In contrast, in the TII Device, cover 20 is provided with a flared nylon nut which is adapted to receive ground terminal 46.

Both devices described above have been purchased by telephone companies and installed in the field.

A relatively recent development is the telephone network interface device; examples may be found in U.S. Pat. Nos. 4,488,008; 4,647,725; and 4,749,359, said three patents being incorporated herein by reference. FCC and state PUC requirements make it desirable to retrofit existing station protector installations, such as the AT&T Device and TII Device, by converting them into network interface devices. Since a telephone company may not know which existing station protector apparatus is installed at a particular location, the telephone company would have to purchase quantities of differing retrofit network devices to attach to the base portions of the AT&T Device and the TII Device. While this procedure would be preferable to scrapping the existing station protector bases, still, at least two different retrofit network interface devices are seemingly needed, since the AT&T cover snaps on, the TII cover, instead, screws on, and each cover has a markedly different shape from the other.

BRIEF SUMMARY OF THE INVENTION

Due to the situation described in the Background of the Invention, it would be desirable to have a retrofit network interface device which is usable on both the pre-installed TII Device base and AT&T Device base. A unitary retrofit network interface device is accomplished by use of an adapter, to allow the exterior of the TII base to somewhat mimic the exterior surface of the AT&T base, so that a cover can be designed which will accept both the pre-existing AT&T base and the pre-existing TII base with an adapter placed thereon.

The TII device is a station protector comprising a base and a wall mounted perpendicularly to the base at one end of the base. The wall has an opening which should not be blocked by the adapter. The adapter is designed to mount the TII device to a cover which is not ordinarily shaped to grasp the TII device. The adapter comprises a first plate, a second plate having an opening therein, said second plate mounted to the first plate; and a first mounting means for mounting the first and second plates to the base and wall, the second plate opening facing the wall opening. In the preferred embodiment, the first mounting means comprises a plurality of clips. A cover comprising a network interface device is also provided.

DETAILED DESCRIPTION OF THE PREFERRED EMBODIMENT

Figure 1:
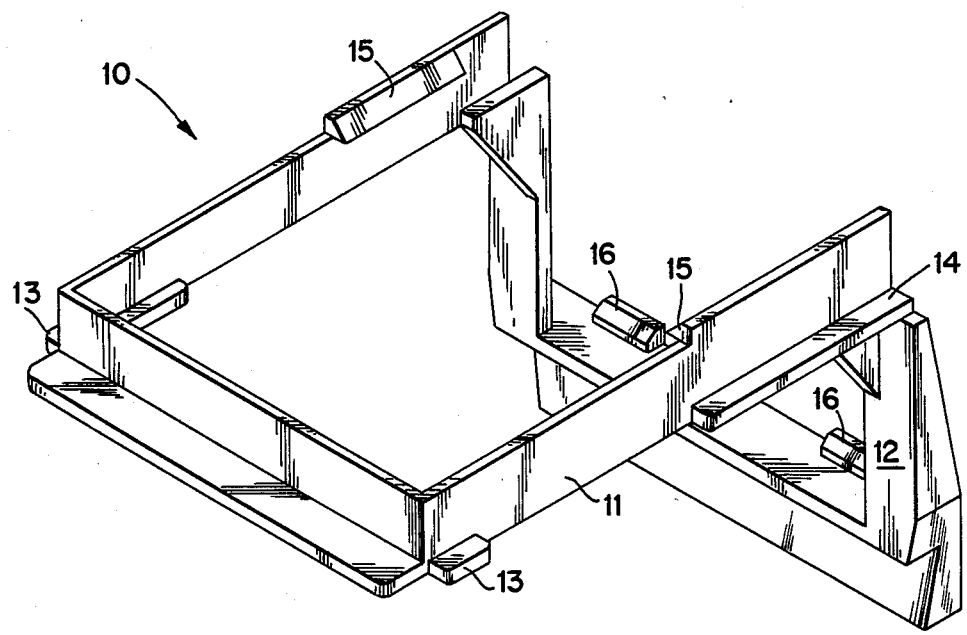
FIG. 1 is a perspective view of the adapter viewed from the side opposite to the second plate.
Figure 2:
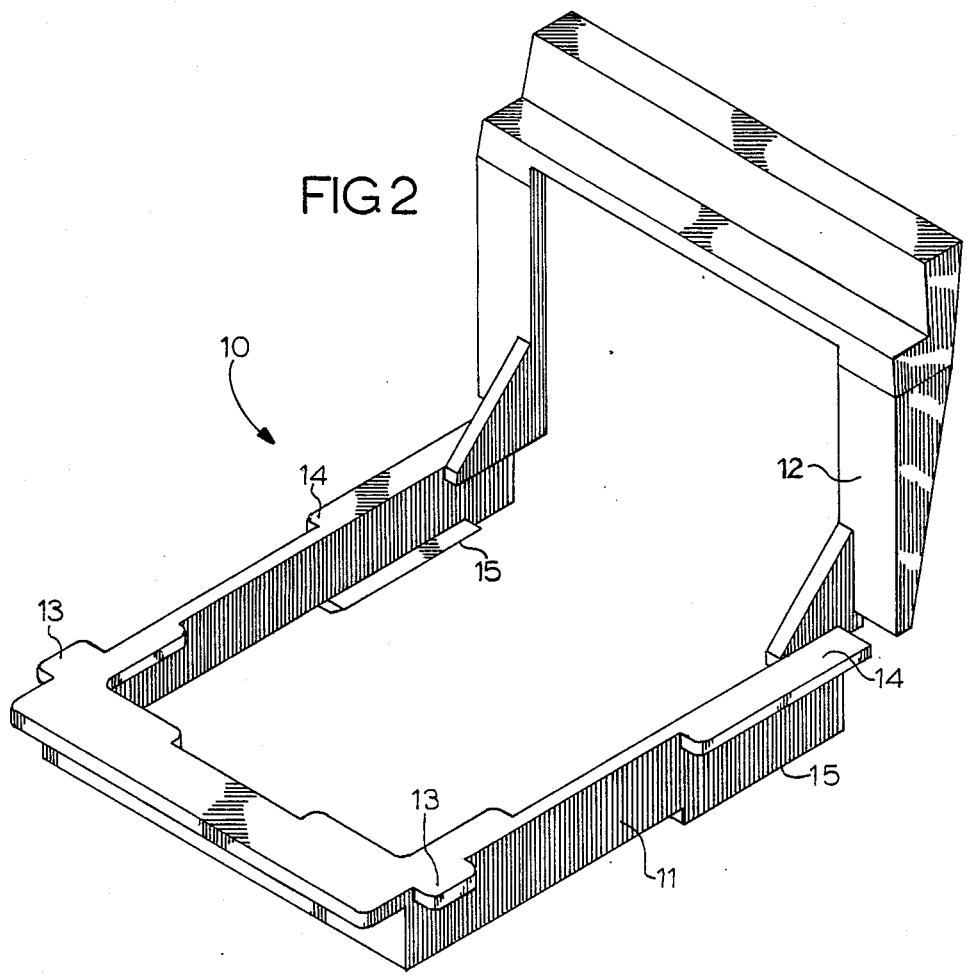
FIG. 2 is a perspective view of the adapter as seen from the second plate side.

Reference is now had to FIGS. 1 and 2, which show two views of adapter 10. Adapter 10, preferably made from a rather stiff plastic, includes first plate 11 and second plate 12 mounted on one end of first plate 11. Tabs 13, 14 on first plate 11 are used in sliding the adapter into the cover. Clips 15 on first plate 11 and clips 16 on second plate 12 are used in affixing the adapter to the TII device, as will be shown below.

Figure 3:
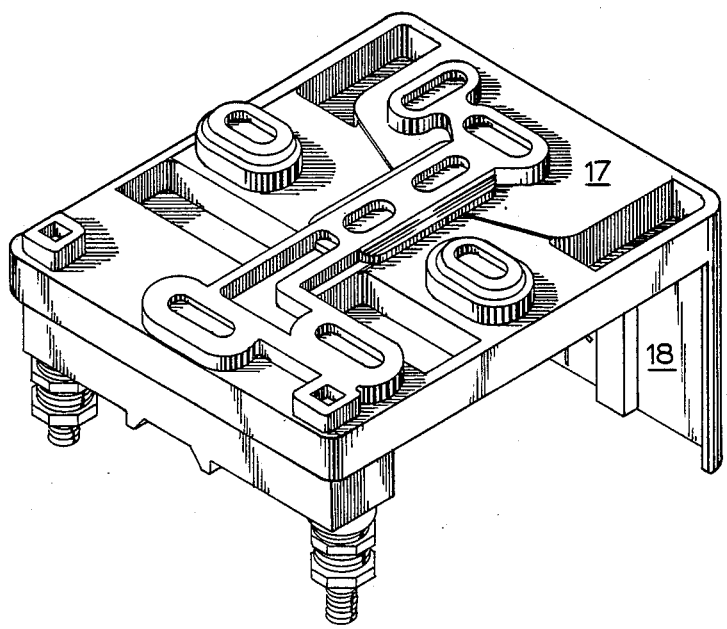
FIG. 3 is a perspective view of the prior art TII device.
Figure 4:
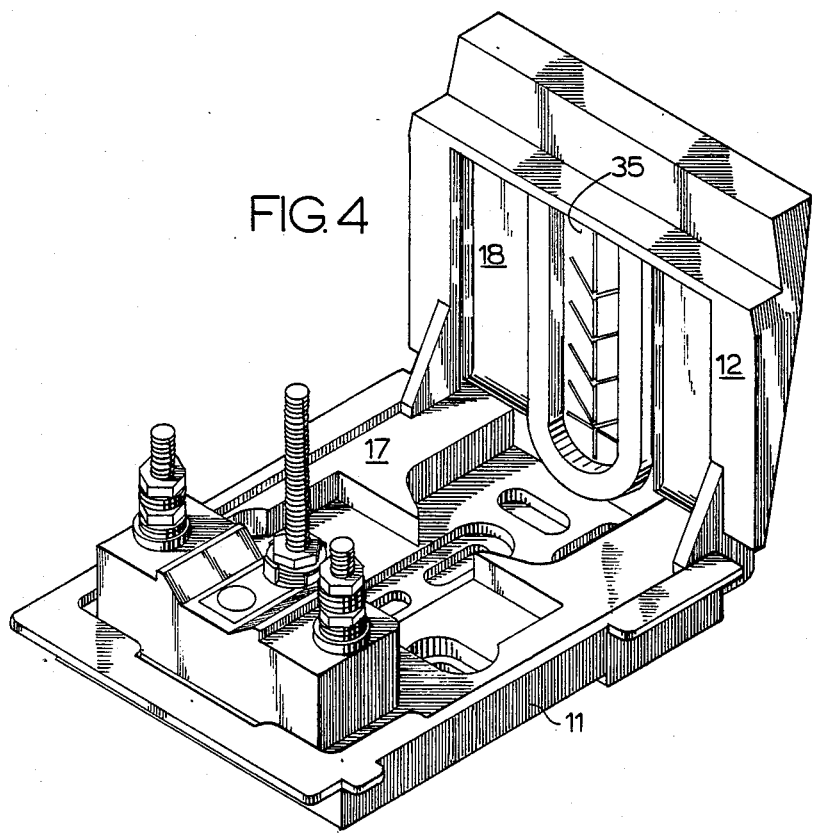
FIG. 4 is a perspective view of the TII device with the adapter having been placed thereon.

FIG. 3 is a view of the prior art TII device, which consists of base 17 and wall 18. FIG. 4 shows the TII device with adapter 10 having been placed thereon, adapter 10 being held onto the TII device by means of clips 15, 16. Grommet 35 in wall 18 of the TII device provides a potential opening through which wires may be strung. Therefore, second plate 12 of adapter 10 contains a rectangular opening, so that grommet 35 will not be blocked.

Figure 5:
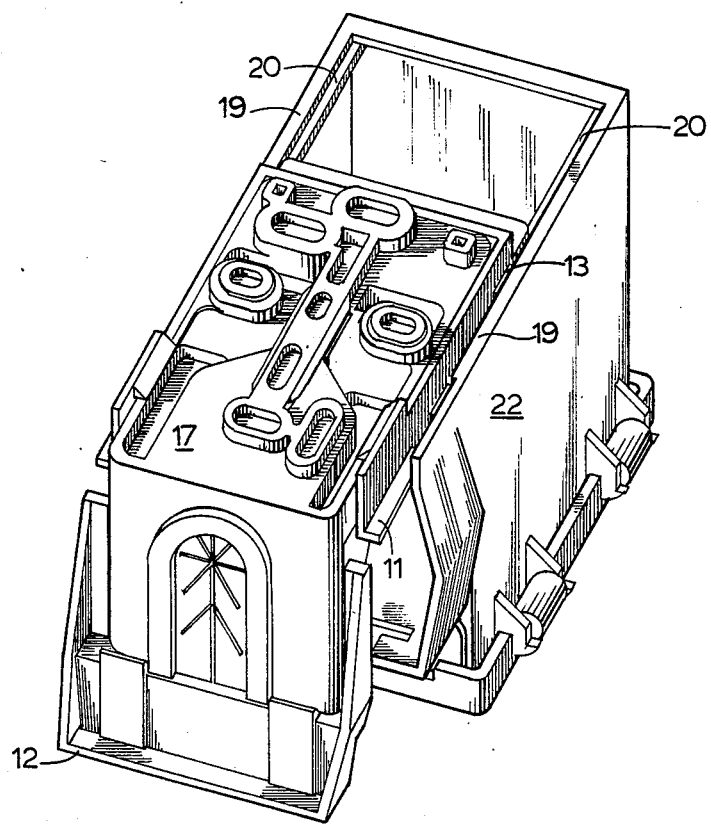
FIG. 5 is a perspective view from underneath the cover, showing the TII device and adapter being slidably placed into the cover.
Figure 6:
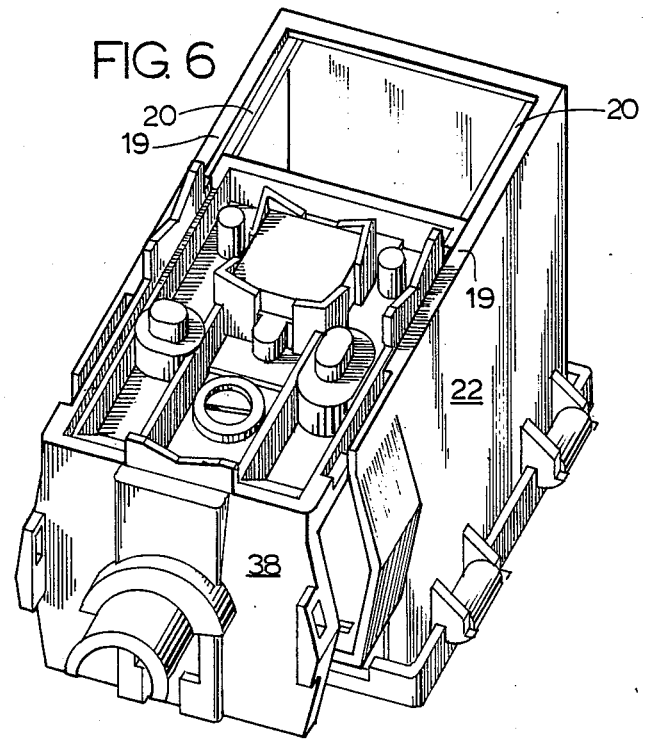
FIG. 6 is a perspective view from underneath the cover, showing the AT&T device being slidably placed into the cover.

FIGS. 5, 6 show the TII device and the adapter (in FIG. 5) and AT&T device 38 (in FIG. 6) being slidably inserted into cover 22. Note the underside of cover 22 is provided with surfaces 19, 20, which form a groove therebetween, into which tabs 13, 14 may be slidably inserted. The AT&T device will also slide into the channel formed by surfaces 19, 20.

Figure 7:
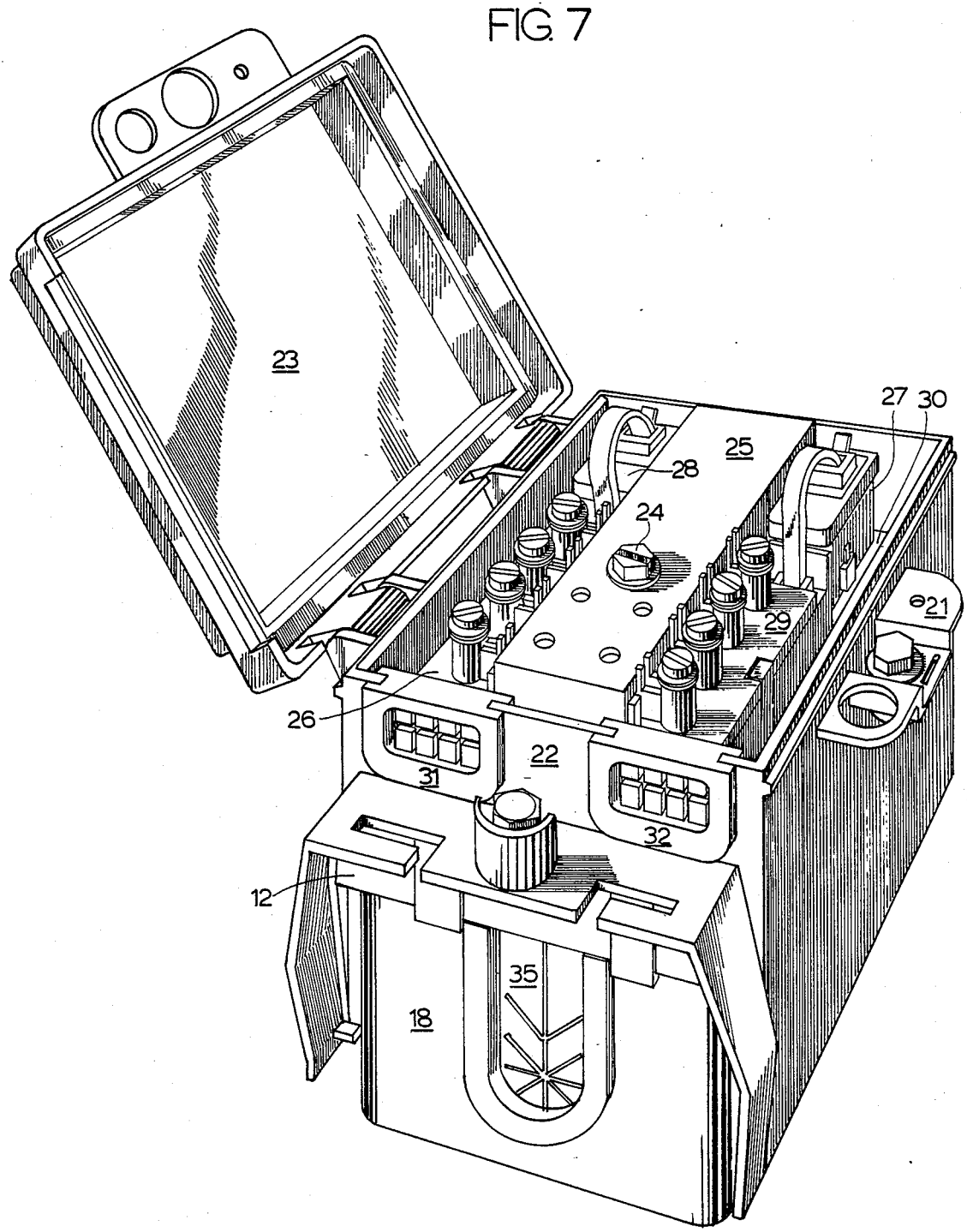
FIG. 7 is a perspective view of the cover, showing the TII device and the adapter placed therein.

FIG. 7 shows cover 22 having the TII device and adapter inserted therein. Note AT&T device 38 could also have been inserted.

Cover 22 has lid 23, which may be opened by unfastening it from projection 21. Revealed are modular terminal sets 26, 29, modular jacks 27, 28, and jack plugs inserted therein. Grommets 31, 32 allow access for wires connected to the terminals.

By removing screw 24, one may remove plate 25 to reveal a second compartment and second set of terminals between plate 25 and floor 30. Floor 30 has four holes therein to allow wires to communicate between the second set of terminals and the station protector. Screw 24 is attached to threads embedded in floor 30.

As a safety feature, the TII device cannot be removed from the adapter while the adapter remains within the cover.

What is claimed is:

1. An adapter for mounting a station protector to a cover, the station protector comprising a base having a wall mounted perpendicular to the base at one end of the base, the wall having an opening which should not be blocked by the adapter, the adapter comprising:
  (a) a first plate;
  (b) a second plate having an opening therein, the second plate mounted to the first plate; and
  (c) first mounting means for mounting the first and second plates to the base and wall, the second plate opening facing the wall opening.

2. An adapter as recited in claim 1, the first mounting means comprising a plurality of clips.

3. An adapter as recited in claim 1, the first and second plates having exterior surfaces so dimensioned as to be removably held by the cover.

4. An adapter as recited in claim 3 and the cover, the cover holding the adapter.

5. An adapter and cover as recited in claim 4, the cover comprising a network interface device.

* * * * *

UNITED STATES PATENT OFFICE
CERTIFICATE OF CORRECTION

Patent No. 4,907,986   Dated March 13, 1990

Inventor(s) Mark W. Muller

It is certified that error appears in the above-identified patent and that said Letters Patent is hereby corrected as shown below:

On the title page, between the entries for the inventor and the application number, insert -- [73] Assignee: Siecor Corporation, Hickory, N. C. --

Signed and Sealed this

Second Day of April, 1991

Attest:

HARRY F. MANBECK, JR.

*Attesting Officer*   *Commissioner of Patents and Trademarks*